United States Patent [19]

McLaughlin

[11] Patent Number: 5,004,030
[45] Date of Patent: Apr. 2, 1991

[54] PNEUMATIC TIRE WITH PIVOTABLE GROUND PADS

[76] Inventor: Hugh R. McLaughlin, Aberdour, Bray Road, Foxrock, County Dublin,

[21] Appl. No.: 454,591

[22] Filed: Dec. 21, 1989

[30] Foreign Application Priority Data

Dec. 21, 1988 [IE] Ireland .................................. 3835/88

[51] Int. Cl.$^5$ ...................... B60C 27/20; B60C 7/22; B62D 55/07; B60D 15/10
[52] U.S. Cl. ................................ 152/225 R; 152/169; 152/185.1; 301/45; 305/19
[58] Field of Search ...................... 152/151, 154.1, 155, 152/156, 167, 169, 170, 176, 178, 179, 180, 182, 185, 185.1, 187, 188, 190, 191, 208, 210, 225 C, 225 R, 226, 227; 180/9.44, 9.46, 10; 301/43, 45; 305/1, 4, 5, 19, 60

[56] References Cited

U.S. PATENT DOCUMENTS

| | | | |
|---|---|---|---|
| 1,090,851 | 3/1914 | Herman | 152/191 |
| 1,600,589 | 9/1926 | Hipkins | 305/19 |
| 2,552,995 | 5/1951 | Morrone | 152/225 R |
| 3,871,720 | 3/1975 | Mosshart et al. | 152/187 |

FOREIGN PATENT DOCUMENTS

| | | | |
|---|---|---|---|
| 1320113 | 6/1987 | U.S.S.R. | 305/60 |
| 1416363 | 8/1988 | U.S.S.R. | 152/185.1 |

*Primary Examiner*—Michael W. Ball
*Assistant Examiner*—Gregory J. Wilber
*Attorney, Agent, or Firm*—Sughrue, Mion, Zinn, Macpeak and Seas

[57] ABSTRACT

The invention provides a pneumatic tire for mounting on a wheel hub, the tire having a plurality of ground engaging pads disposed around the periphery of the tire. Each pad is capable of at least a limited degree of rotational displacement about a radial axis relative to the tire, so that the tire may turn through the limited rotation relative to any pad which is in ground contact. A means is provided for returning each pad to its undisplaced position when the pad has moved out of contact with the ground.

8 Claims, 3 Drawing Sheets

PNEUMATIC TIRE WITH PIVOTABLE GROUND PADS

The present invention relates to wheels for machines which normally require wide faced tires for the purpose of spreading the load carried over grass covered ground or other soft surfaces, for example, golf fairways. In particular, the invention relates to wheels for use on golf carts, grass mowing machines and other mobile apparatus.

According to the invention there is provided a pneumatic tire for mounting on a wheel hub, the tire having a plurality of ground engaging pads disposed around the periphery of the tire, each pad being capable of at least a limited degree of rotational displacement about a radial axis relative to the tire, whereby the tire may turn through the said limited angle relative to any pad currently in ground contact, and means for returning each pad to its undisplaced position when the pad has moved out of contact with the ground.

The tire is preferably mounted on a conventional wheel hub, and a conventional tube is provided to inflate the tire to the correct pressure.

An embodiment of the invention will now be described, by way of example, with reference to the accompanying drawings, in which.

Figure 1:
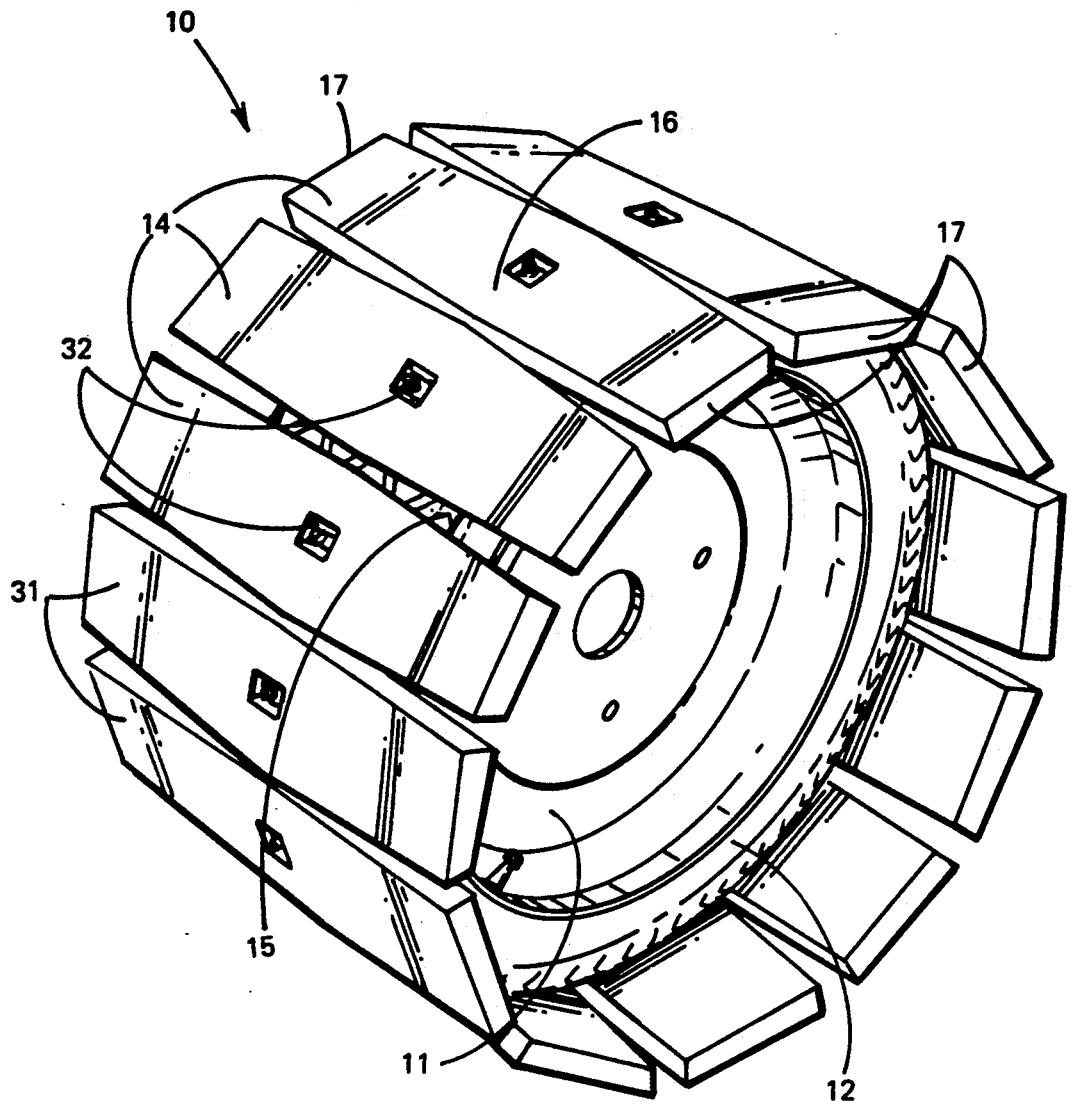
FIG. 1 is a perspective view of a wheel incorporating the tire according to the invention.

Referring now to the drawings, wherein similar numerals have been used to indicate like parts, there is shown therein a wheel and tire generally indicated at 10 according to the invention. The wheel 10 comprises a rigid hub 11 having mounted thereon a pneumatic tire 12. The tire 12 incorporates a conventional inflatable tube 13, which when inflated pressurises the tire to an appropriate pressure. A plurality of ground engaging pads 14 are disposed around and coupled to the periphery 15 of the tire 12. Each pad which is of a resilient material, for example rubber, is of a width of approximately 1¼ inches and of a length in the direction of rotation of the tire of approximately 5 inches As shown, the pads 14 are slightly spaced apart and taper from their widest central part 16 towards the ends 17.

The pads 14 are coupled to the periphery of the tire 12 by a coupling means, as will now be described, so as to permit each pad at least a limited degree of rotational displacement about a notional radial axis relative to the tire 12. The coupling means comprises a spindle 18 which passes through an aperture 19 in the tire 12. The spindle 18 has a plate member 20 fixed at its end 21, the plate member 20 engaging the inner surface 22 of the tire to locate the spindle 1B in position.

A rubber washer 23 is fixed to the outer surface 24 of the tire in the region of the aperture 19. A locking plate 25 is located on the spindle 18 adjacent to the rubber washer 23, and a locking nut 26 engages with suitable screw-threads 27 on the spindle 18, to securely lock the spindle 18 to the tire 12.

A nylon bearing plate 28 is located over the locking nut 26, the aperture 29 in the bearing plate 28 into which the locking nut 26 is received being of a greater diameter than the diameter of the locking nut 26. Thus, the bearing plate 28 can be rotated freely on the locking nut 26. The ground engaging pad 14 comprises a base plate 30 on which is fixed a rubber block 31 having a square shaped aperture 32. The base plate 30 has a circular aperture 33 through which a shoulder portion 34 of the spindle 18 engages. The aperture 33 is very slightly greater in diameter than the diameter of the shoulder portion 34 of the spindle 18, so that the pad 14 can turn freely relative to the spindle 18.

The free end 35 of the spindle 18 is formed as a square shape and the pad 14 is secured on the spindle 18 by means of a square shaped retaining block 36 which is held in place by a suitable circlip 37 secured to the spindle 18 as shown.

As shown the retaining block 36 is located on the spindle 18 within the region of the squared shaped aperture 32 in the rubber block 31. The retaining block 36 is of a diameter slightly less than that of the aperture 32.

It will therefore be appreciated that the spindle 18 serves only the purpose of coupling the pads 14 to the tire 12. When the wheel 10 supports any weight, the pads 14 carry the weight which is transferred to the tire 12, by the pad 14 pressing against the nylon plate 28 which in turn presses against the outer surface 24 of the tire 12.

When the tire 12 is turned relative to that one of the pads 14 which is in contact with the ground surface, the pad will remain stationary and the tire 12 and spindle 18 including the retaining block 36, will rotate a predetermined angular distance approximately 4° to 15°. As the retaining block 36 rotates, it will engage and compress the walls of the rubber block 31 which define the aperture 32. Thus, the rubber block 31 in the region of the aperture 32 will be compressed and the relative angular movement of the tire will be determined, by the degree of resilience of the rubber block 31 and by how long the pad 14 remains in ground contact. Once the pad 14 moves out of ground contact, the resilience of the rubber block 31 causes the pad 14 to return to its norma position. As described previously, the pads 14 are tapered to facilitate relative turning of the pads.

Instead of using rubber block 31, expansion springs (not shown) may be used one fixed at one side of each pad 14 with the other end of each spring fixed to the hub 11 of the wheel. This will enable the pads to be returned to their undisplaced position.

Figure 4:
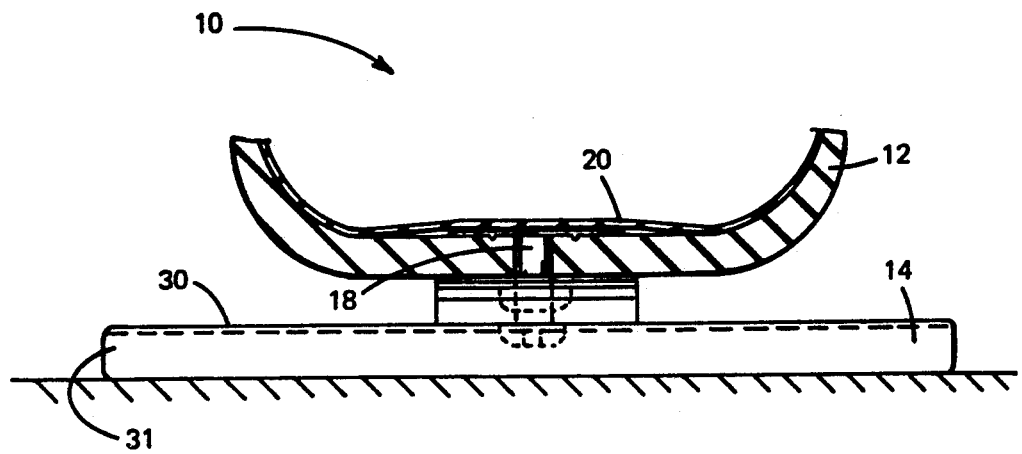
FIGS. 4 and 5 are diagrammatic views of one of the pads of the wheel of FIG. 1 in ground contact.
Figure 5:
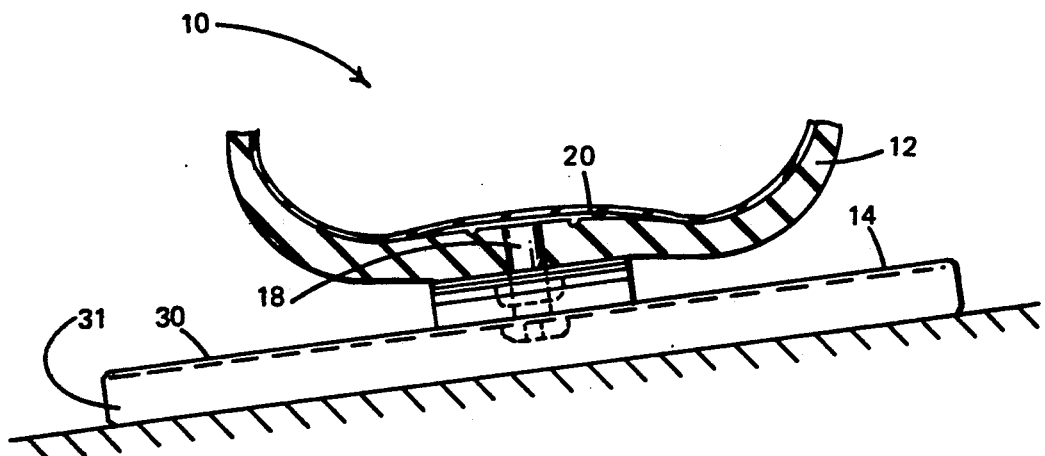

As shown diagrammatically in FIGS. 4 and 5 the invention provides a construction of wheel and tire which enables the substantial reduction of ground compaction by spreading the weight carried over a greater area being that of the pads 14 which provide a very much larger area than that of the typical tire. The p.s.i. pressure exerted by the pads on the ground surface is substantially less than that exerted by convention wide faced tires. Also, this wheel can turn without damage to the ground surface because the pads 14 remain stationary on the ground surface while the wheel itself turns. The damage to the ground surfaces caused by wheels turning on sloping ground surfaces is also mitigated because the pads 14 will always remain flat on the ground surface as shown in FIG. 5.

The invention maintains the advantage of pneumatic tires being that of air cushioning.

In another embodiment of the invention the entire circumference of the tire is covered by a one piece sleeve of flexible rubber which is attached by known means, for example vulcanising to each base plate 30. In order to gain the necessary benefits of individual pads, the rubber sleeve would have a number of spaced apart slots, with the space between each adjacent pair or slots defining a recess for a pad. This arrangement would have a continuous central rubber area with the necessary flexibility to provide a smooth running revolution of the wheel.

Figure 2:
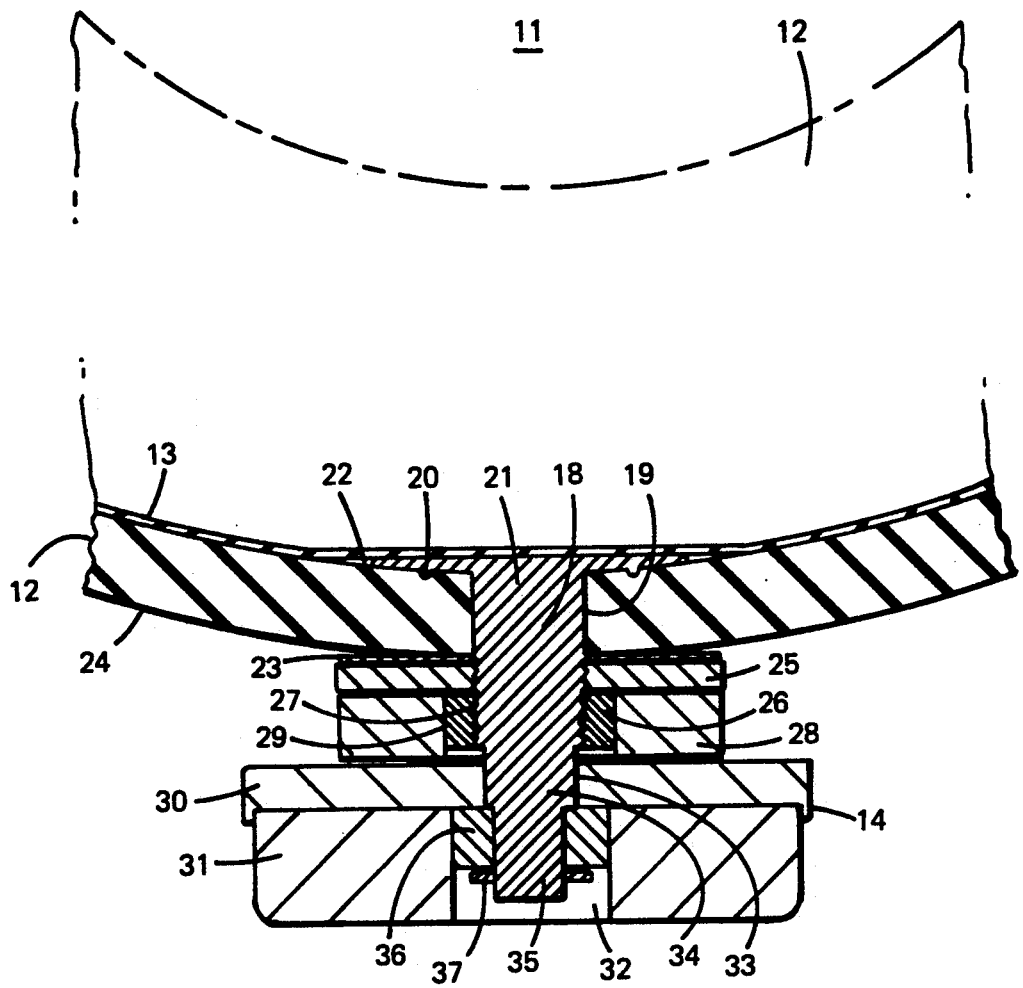
FIG. 2 is a cross-sectional view of the wheel of FIG. 1.
Figure 3:
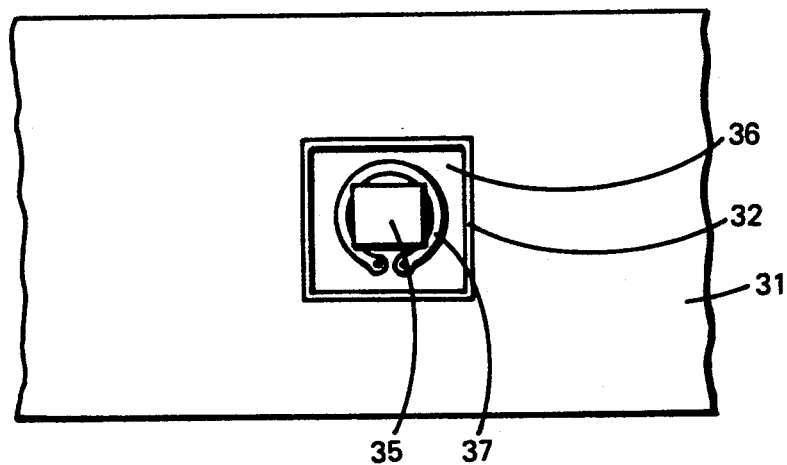
FIG. 3 is a plan view of part of one of the pads shown in FIG. 1.

Rather than the coupling means shown in FIG. 2, another embodiment of the invention provides a pneumatic tire having flexible rubber mountings integrally formed with and protruding from its ground engaging surface. The ground engaging pads are attached to the rubber mountings. Such a flexible mounting would allow the hub of the wheel to turn at ground contact and return the pad to its undisplaced position as soon as it comes off ground pressure. Also, rubber blocks, for example car engine mounting blocks could be secured to the tire with the mounting block also fixed to the base plate of the pads.

All the novelty and benefits of the invention may be maintained by having the combination of pneumatic tire and pads manufactured as a single unit rubber moulding. This would eliminate the necessity for the mechanical linkage between the pads and the tire. The inherent flexibility of the rubber would allow the pads to twist to the necessary extent thereby eliminating the need for the mechanical means of returning the pad to its undisplaced position after each pad rolls off ground contact. The flexibility of the relatively narrow region of pad in direct contact with the tire surface, would allow the hub of the wheel to turn without causing the pad to slide at ground contact when it takes the weight of the machine. Fibre or other known reinforcing material could be moulded (or inserted) with the tire so as to strengthen the wide cross section area of each pad.

Other advantages of the wheel according to the invention include: the tire cannot wear out, or be punctured; the pads are replaceable without having to deflate the tire; the size of the pads can be selected to suit the size of the wheel; the tire may or may not be tubeless.

I claim:

1. A traction device, comprising: a pneumatic tire for mounting on a wheel hub, the tire having a plurality of ground engaging pads disposed around the periphery of the tire, each pad being capable of at least a limited degree of rotational displacement about a radial axis relative to the tire, whereby the tire may turn through the limited rotation relative to any pad currently in ground contact, and means for returning each pad to its undisplaced position when the pad has moved out of contact with the ground.

2. A pneumatic tire as claimed in claim 1 wherein there is provided coupling means for coupling each pad to a periphery of the tire.

3. A pneumatic tire as claimed in claim 2, wherein the coupling means comprises a spindle which projects through an aperture in the tire, the spindle having a plate member, fixed to one end, the plate member engaging an inner surface of the tire, and a free end of the spindle being connected to a ground engaging pad.

4. A pneumatic tire as claimed in claim 1, wherein each ground TM engaging pad comprises a base plate on which is fixed a resilient block of material.

5. A pneumatic tire as claimed in claim 3 wherein a bearing plate is located on the spindle between the outer surface of the tire and the ground engaging pad.

6. A pneumatic tire as claimed in claim 3, wherein the free end of the spindle projects through an aperture in the base plate and into a recess in the resilient block, and a retaining member is secured on the free end of the spindle.

7. A pneumatic tire as claimed in claim 6, wherein the retaining member engages with the resilient block such that when the tire is turned the retaining member of the pad in ground contact compresses the resilient block and when said pad moves out of ground contact a inherent resilience of the resilient block causes the pad to return to its normal position.

8. A pneumatic tire as claimed in claim 1 wherein the ground engaging pads are slightly spaced apart and taper from their widest central part towards the ends.

* * * * *